US00RE40451E

(19) United States
(12) Reissued Patent
Suutari et al.

(10) Patent Number: US RE40,451 E
(45) Date of Reissued Patent: Aug. 5, 2008

(54) PROCEDURE FOR ENSURING THE OPERATION OF SIGNALLING CHANNELS IN A V5 INTERFACE

(75) Inventors: Jyrki Suutari, Oulu (FI); Toivo Lallukka, Oulu (FI); Arto Rukajärvi, Oulunsalo (FI); Olli Liinamaa, Oulu (FI)

(73) Assignee: Nokia Corporation, Espoo (FI)

(21) Appl. No.: 10/645,345

(22) Filed: Aug. 21, 2003

Related U.S. Patent Documents

Reissue of:
(64) Patent No.: 6,278,688
Issued: Aug. 21, 2001
Appl. No.: 09/336,862
Filed: Jun. 21, 1999

U.S. Applications:
(63) Continuation of application No. PCT/FI98/00198, filed on Mar. 5, 1998.

(30) Foreign Application Priority Data

Mar. 18, 1997 (FI) ..... 971142

(51) Int. Cl.
*H04Q 11/04* (2006.01)
*H04Q 3/00* (2006.01)
*H04M 7/00* (2006.01)

(52) U.S. Cl. ..... 370/217; 370/228; 370/522; 379/279

(58) Field of Classification Search ..... 370/217, 370/228, 522
See application file for complete search history.

(56) References Cited

U.S. PATENT DOCUMENTS 5,418,776 A 5/1995 Purkey et al. ..... 370/217
5,751,574 A 5/1998 Loebig ..... 700/82
5,781,623 A 7/1998 Khakzar ..... 379/230
5,805,666 A 9/1998 Ishizuka et al. ..... 379/1.01
5,910,980 A 6/1999 Ogasawara et al. .... 379/142.01
6,069,948 A 5/2000 Yrjana ..... 379/230
6,252,955 B1 * 6/2001 Antila et al. ..... 379/219
6,347,138 B1 * 2/2002 Lallukka et al. ..... 379/220.01

FOREIGN PATENT DOCUMENTS

EP 0792079 A1 8/1997
WO WO 96/17484 6/1996
WO WO 97/16936 5/1997
WO WO 97/35404 9/1997

OTHER PUBLICATIONS

A. Gillespie "Interfacing Access Networks to Exchanges: The ETSI V5 Approach" *IEEE Telecommunication Conference,* vol. 3, pp. 1754–1758, Dec. 1992.
K. Khakzar "V5 Interfaces between Digital Local Exchanges and Access Networks" *Frequenz,* vol. 48, No. 1–2, pp. 44–50, 1994.
International Search Report for PCT/FI98/00198—Apr. 9, 1998.

* cited by examiner

*Primary Examiner*—Alpus H Hsu
(74) *Attorney, Agent, or Firm*—Squire Sanders & Dempsey L.L.P.

(57) ABSTRACT

The present invention relates to a procedure for ensuring the operation of signalling channels in a V5 interface between a local exchange (LE) and an access node (AN). The interface includes at least two links (L), in conjunction with redefinition of the interface composition. Redefinition generally involves making changes in the V5 interface data, such as the location of signalling channels on the links. According to the invention, the operation of protected channels in conjunction with restarting is ensured by starting the protected channels on the channels defined for them in the new composition and on the channels to which they were transferred in conjunction with the protection switch-over.

5 Claims, 1 Drawing Sheet

= backup channel (standby)

= signalling channel

PROCEDURE FOR ENSURING THE OPERATION OF SIGNALLING CHANNELS IN A V5 INTERFACE

Matter enclosed in heavy brackets [ ] appears in the original patent but forms no part of this reissue specification; matter printed in italics indicates the additions made by reissue.

This application is a continuation of international application number PCTIFI98/00198, filed Mar. 5, 1998, pending.

FIELD OF THE INVENTION

The present invention relates to a procedure for ensuring the operation of protected signalling channels in a V5 interface between a local exchange and an access node in conjunction with a redefinition of the composition of the interface.

DESCRIPTION OF RELATED ART

Open interface (V5.1 and V5.2) between an access node and a local exchange are defined in the TTSI (European Telecommunications and Standards Institute) standards of the ETS 300 324 and ETS 300 347 series. V5 interfaces enable subscribers belonging to a physically separate local network to be connected to a telephone exchange using a standard interface. In the present application, V5 interface expressly refers to a dynamic concentrator interface (V5.2) as defined in the ETS 300 347 standard series, consisting of one or more (1–16) PCM (Pulse Code Modulation) cables. One PCM cable comprises 32 channels, each of which with a transfer rate of 64 kbit/s, i.e., 2048 kbit/s in all. The V5.2 interface supports analogue telephones as used in the public telephone network, digital, such as ISDN (Integrated Services Digital Network) basic and system subscriber connections as well as other analogue or digital terminal equipment based on semi-fixed connections.

Certain time slots in the V5 interface, which form a channel called C-channel, serve to transmit the protocols used for controlling the interface itself and the calls transmitted over the interface. A C-channel or a 64 kbit/s time slot reserved for this purpose serves to transmit information that may belong e.g. to the Control protocol, Link control protocol, Protection protocol or BCC protocol of the V5 interface, or which may consist of PSTN signalling or ISDN data. Further, according to the standards mentioned above, a C-channel can be reserved for time slots 16, 15 and/or 31 in the PCM line or V5 interface link. Especially in a V5.2 interface, the system automatically creates C-channels for the critical protocols (Control, Link control, BCC and Protection), whereas the operator can place the PSTN signalling as desired, either in the same channel with the critical protocols or in another C-channel. In addition, the operator may allocate a maximum of three signalling channels as so-called backup channels. These channels are resorted to in the case of a failure of the link to which the channels were originally allocated. In a V5.2 interface having more than one 2-Mbit/s link, a link whose physical C-channel in time slot 16 transmits the Control, Link control, BCC and Protection protocols is defined as the primary link. Further, a link whose physical C-channel in time slot 16 only transmits the Protection protocol is a secondary link.

The above-mentioned standards define two different ways of changing the data for a V5 interface already activated. Changing the data means e.g. that a signalling channel is transferred to another time slot or that additional signalling channels are introduced. Such changes can be effected using the so-called reprovision function defined in the standard, in which case the altered data are given a new "designation" (provision variant) at both ends, i.e. in the local exchange and in the access node. The provision variant is a parameter which is checked in conjunction with the start-up of the V5 interface. This verification serves to ensure that both the local exchange and the access node observe the same composition in the V5 interface. Composition means in the first place the locations and order of the signalling channels. When the parameter in question is assigned a new value, this means that e.g. the signalling channels have a new location. When the changes are activated at both ends, i.e. when the interface is started up, the hardware first ensures via signalling that the new value of the "provision variant" is known at both ends, whereupon the changes of composition or configuration are made independently according to the parameter in question. However, it is also possible to make changes in the V5 interface without using the reprovision function. In this case, the changes are made independently at both ends without altering the value of the provision variant parameter. When the changes are activated, the defined changes are made automatically at both ends and the interface is started up.

The locations of the signalling channels in an active interface may change in consequence of a protection switch-over of a signalling channel. This creates a situation where the interface configuration is no longer consistent with the configuration originally defined by the operator. The problem is that the above-mentioned standards do not define whether the possible protection switch-over cases should be taken into account or not when a new configuration or composition is introduced. Further, when the composition of the interface is being defined, it must also be taken into account that one of the links may have been damaged and that consequently the signalling channels transmitted via that link are switched over to another link. FIGS. 1a and 1b present an example of such a situation. FIG. 1a illustrates normal operation between a local exchange LE and an access node AN. In this V5 interface, the signalling channel, which may be e.g. the BCC protocol, has been allocated to the topmost link in the V5 interface. Further, a backup channel has been allocated to the bottom most link in the interface. FIG. 1b illustrates an example situation where the backup channel and signalling channel are swapped, i.e. the signalling channel is switched over to the backup channel when the link is damaged.

SUMMARY OF THE INVENTION

The object of the present invention is to eliminate the problems described above. A specific object of the present invention is to present a new procedure that makes it possible to flexibly ensure the activation of the signalling channels in a V5 interface when a new composition is defined for the V5 interface without the reprovision function.

In the procedure of the invention, in a V5 interface between a local exchange and an access node, said interface comprising at least two links, to ensure the operation of the signalling channels in conjunction with a redefinition of the interface composition, in which redefinition changes are made in the V5 interface data, such as the placement of signalling channels on the links, according to the invention, the operation of protected channels is ensured in conjunction with restarting by activating the protected channels on the channels defined for them in the new composition and/or on the channels to which they were transferred in conjunction with the protection switch-over. The redefinition of the V5 interface composition is preferably carried out independently both in the local exchange and in the access node without changing the value of the interface composition parameter.

In an embodiment of the invention, the channels transferred to a backup channel in conjunction with protection switch-over are left at the locations to which they were transferred in conjunction with the switch-over, regardless of the redefined composition of the V5 interface.

In an embodiment of the invention, changes in conjunction with a redefinition of the composition of a V5 interface are made in the original composition regardless of protection switch-over operations carried out in the V5 interface.

BRIEF DESCRIPTION OF THE DRAWINGS

In the following, the invention will be described by the aid of a preferred embodiment by referring to the attached drawings, in which:

FIG. 1b represents a functional state of the V5 interface in FIG. 1a;

DETAILED DESCRIPTION OF THE INVENTION

Figure 1A:
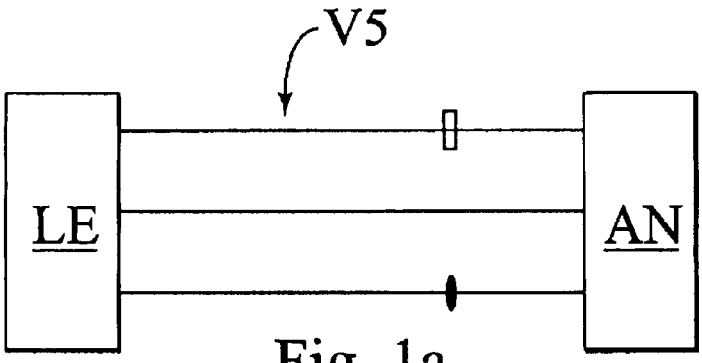
FIG. 1a represents a V5 interface according to the invention.
Figure 1B:
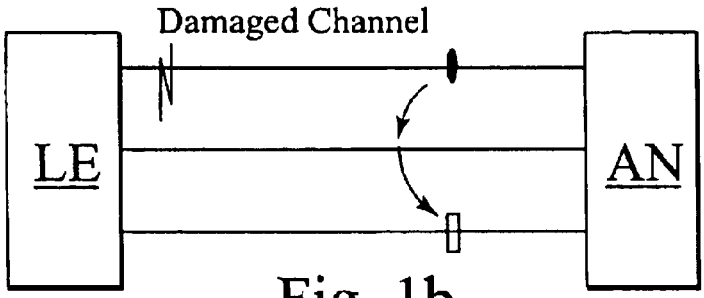

FIGS. 1a and 1b present a V5 interface according to the invention between a local exchange LE and an access node AN. In FIG. 1a, a signalling channel has been configured to use the topmost link in the V5 interface. Further, a backup channel to which one of the signalling channels can be switched over has been configured to be carried by the bottom link. In FIG. 1b, a switch-over of the signalling channel to the backup channel is carried out due to malfunction of the top link, in other words, the signalling channel originally allocated to the top link is transferred to the bottom link in place of the backup channel.

Figure 2A:
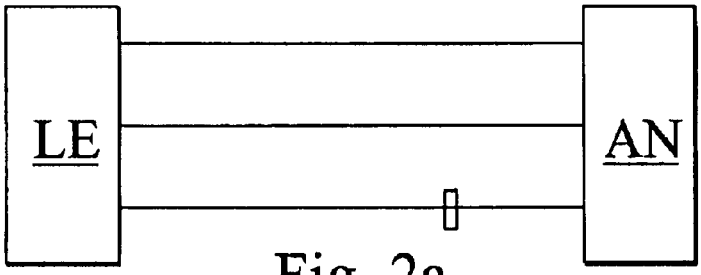
FIG. 2a represents a functional state according to the present invention.
Figure 2B:
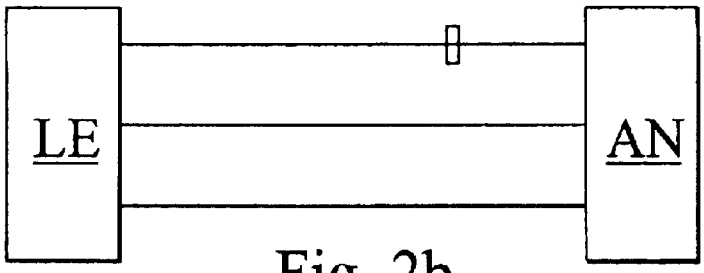
FIG. 2b represents another functional state according to the present invention.

FIG. 2 illustrates a solution according to the invention for ensuring the activation of the signalling channels when a new V5 interface composition is defined without using the reprovision function. In the solution presented in FIG. 2, when a backup configuration is introduced, protection switch-overs of signalling channels carried out previously in the interface are taken into account. In practice, this means that the signalling channels already switched over as illustrated by FIG. 2a are left at the locations to which they have been transferred in consequence of protection switch-over, in this case on the lowest link, and not at the locations where they were placed in the original configuration. Further, in FIG. 2a a redefinition has been performed in which it has been decided that the original backup channel, which has been on the lowest link as shown in FIG. 1a, shall be removed. The system removes it based on the situation after the switch-over, so in this case the backup channel is removed from the physical location that in the operator's original composition contained a signalling channel (from the top link). FIG. 2b illustrates another solution according to the invention for ensuring the activation of signalling channels. In the arrangement presented in FIG. 2b, the changes are made in the composition originally created in the system by the operator, without taking into account any protection switch-overs carried out before. Thus, in a situation as illustrated by FIG. 2b, the system removes the signalling channel from the physical location where the operator had originally placed it, in this case from the lowest link.

The invention is not restricted to the examples of its embodiments described above, but many variations are possible within the scope of the inventive idea defined by the claims.

What is claimed is:

1. A method for ensuring the operation of signaling channels in a V5 interface between a local exchange and an access node, the interface comprising:

reconfiguring V5 interface data in an interface composition having at least two signaling channels; and ensuring active operation of protected signaling channels when starting a V5 interface, wherein the protected signaling channels are started on *at least one of* signaling channels defined in a new interface composition, and on signaling channels to which the protected signaling channels were transferred in a protection switch-over.

2. The method as defined in claim 1, wherein the reconfiguring V5 interface data in the interface composition is carried out independently both in a local exchange and in an access node without changing a value of an interface composition parameter.

3. The method as defined in claim 1, wherein the protected signaling channels transferred to a backup channel in a protection switch-over, remain at locations to which they were transferred in the protection switch-over, regardless of the reconfigured composition of the V5 interface.

4. The method as defined in claim 1, wherein composition changes in the reconfiguration of the composition of the V5 interface are made in an original composition regardless of protection switch-over operations carried out in the V5 interface.

5. The method as defined in claim 1, wherein an interface composition parameter is a provision variant parameter of the V5 interface, wherein the provision variant parameter includes the reconfigured V5 interface data.

* * * * *